July 29, 1958

P. M. HALL 2,845,522

METHOD OF PROJECTION WELDING OF HANDLE
OR BAIL EARS OR LUGS UPON RECEPTACLES

Filed May 25, 1956

INVENTOR
Preston M. Hall

BY *Lancaster, Allwine & Rommel*
ATTORNEYS

United States Patent Office 2,845,522
Patented July 29, 1958

2,845,522
METHOD OF PROJECTION WELDING OF HANDLE OR BAIL EARS OR LUGS UPON RECEPTACLES

Preston M. Hall, Silver Spring, Md., assignor of fifty percent to Edward C. Hall, Bridgeport, Conn.

Application May 25, 1956, Serial No. 587,339

8 Claims. (Cl. 219—93)

The present invention relates to an improved method for the economical and efficient projection welding of bail or handle attaching ears or lugs upon receptacles.

It has heretofore been proposed to weld lugs, ears, or keys upon coated sheet metal bodies through the application of pressure so as to cause projections of the lugs or keys to penetrate small areas of the coating and contact the base metal of the receptacle or body to which the ear or lug is to be welded. Very often such projections will not efficiently penetrate the coating, especially if it is hard and wear resistant, such as baked enamel, lacquer and some other types of insulating coatings. I have solved the difficulty of economically and effectively welding the bail or handle lugs or ears upon the base metal of a container through the shaping of the lugs in respect to the contour of the receptacle so that upon the application of pressure to the lug or ear and receptacle, between the electrodes, projections of the ear or lug will penetrate and laterally scrape upon and through the receptacle coating, removing the later at an area through which the base metal is exposed, whereby upon the application of the welding current the material of the projection and the base metal of the receptacle will be efficiently fused together throughout an area which will make a strong weld.

It is a further object of this invention to provide a new article of manufacture comprising a receptacle or other base metal body to which is projection welded a bail or handle attaching ear, lug or other member along an area which has been grooved through the coating of the receptacle.

Other objects and advantages of this invention will be apparent during the course of the following detailed description.

In the accompanying drawing, forming a part of this specification, and wherein similar reference characters designate corresponding parts throughout the several views.

Figure 1:
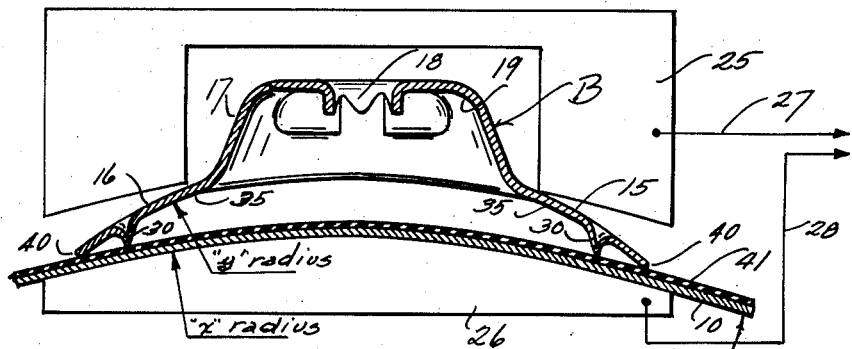
Figure 1 is a fragmentary sectional view taken through a portion of the receptacle and through an ear to be welded thereto showing the initial formation and application of the ear and the receptacle as placed between the welding electrodes.

In the drawing wherein for the purpose of illustration is shown only a preferred embodiment of the invention, the letter A may generally designate the receptacle or other foundation upon which it is desired to weld an ear or lug B for supporting a conventional receptacle bail (not shown).

It is well known in the art that receptacles such as shown at A conventionally include a body 10 of base metal having a coating 11 externally thereon, usually of some insulating material, such as lacquer, enamel, or the like. For the most part, such lugs or ears for supporting handles or bails are riveted upon the receptacle. Initially, such riveting may rigidly connect the lug to the receptacle, but breaking of the coating material sooner or later will cause loosening of the lug or ear. Moisture is allowed free admission to the rivet between the ear and the receptacle, causing corrosion, rust, etc., and ultimately the loosening of the handle ears upon the receptacle. Because the coating is usually of insulation material, electrical welding of ears or lugs upon the receptacle is not very effective.

In the drawing, the radius of the receptacle body 10 (designated at "$x$"), by way of example may be 5¼ to 6 inches.

The lug B is preferably of sheet metal and it may assume various designs and formations. It preferably includes a base formed of flanges 15 and 16 struck from a radius "$y$" which is appreciably less than the radius "$x$," say 1½ inches. The bail or handle connecting body 17 of the lug is preferably a cap having an opening 18 through which the bail or handle end may be inserted and connected in the chamber 19, in a manner commercially well understood.

Conventional welding dies or electrodes 25 and 26 are provided, externally and internally, for the welding of the lug or ear B upon the receptacle A. They have line connections 27 and 28 suitably connected to the source of the current.

Upon the arcuate flanges 15 and 16 I provide welding points or projections 30 which may be struck inwardly at their concaved sides and sharply pointed at their inner ends. These projections need not necessarily have passageways therethrough, but they do project in pointed relation appreciably inwardly of the inner concave surfaces 35 of the flanges 15 and 16. Preferably the axes of these projections are not radial of the arc of the flanges 15 and 16, but acutely angled with respect thereto; the points being turned in sloping relation towards the outermost edging 40 of the respective flanges. The points may be opened or closed, and more than one may be provided upon each flange, if desired.

The welding dies or electrodes 25 and 26 are provided with suitable shaping to conform to the contours of the lug and receptacle as they are moved together and to enable the flanges of the lug B to deflect laterally.

Figure 2:
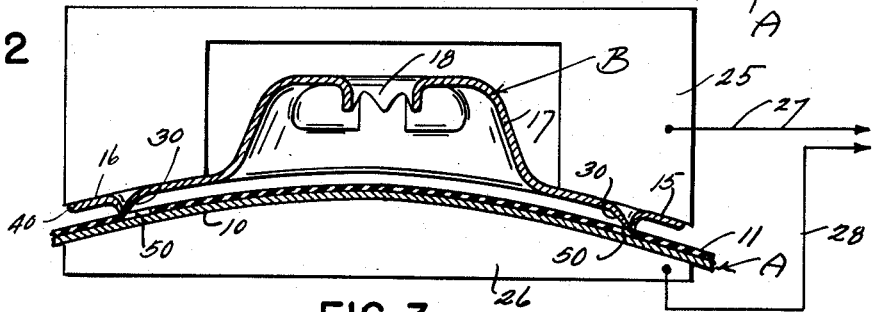
Figure 2 is a view which shows a succeeding step in the method of application of the lug to the receptacle in which the lug or ear has been deflected so as to cause a penetrating and scraping action of the welding projections upon the receptacle, through the coating thereof, whereby to engage the projections directly upon the base metal of the receptacle body.
Figure 3:
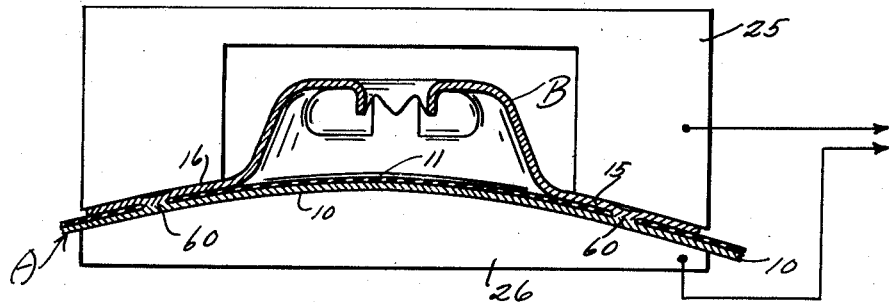
Figure 3 is a cross sectional view through the parts in a succeeding step in which the lug and receptacle are under welding pressure between the electrodes with the welding current operating for the formation of strong and durable welding of the lug or ear to the receptacle.
Figure 4:
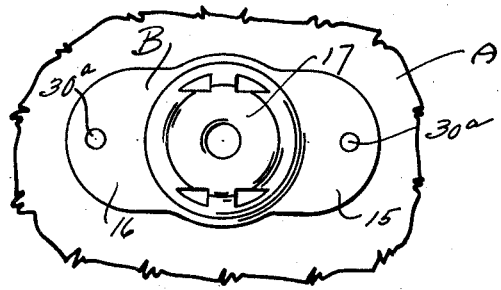
Figure 4 is a plan view showing a portion of the receptacle with an ear or lug welded thereto.

In the initial step, the receptacle A has the lug B assembled thereto between the platens 25 and 26 in any approved equipment in which the electrodes 25 and 26 may be mounted and moved under pressure to deflect the contour of the flanges 15 and 16 into radial conforming relation to the receptacle body 10, as shown in Figure 2. Under these circumstances it will be noted that the pointed projections 30 will be forced to penetrate the coating 11 and scrape along the base metal 10 of the receptacle, causing line grooving 50 which completely exposes the base metal to the welding projections 30. The electric current through the welding dies is preferably not operative during the initial pressure action of the dies for forcing the lug to the position shown in Figure 2. Thereafter and during continued pressure action of the lug and body of the receptacle between the electrodes the welding current is applied to the electrodes for flattening the projections 30 in the areas 50 scraped from the coating 11, and thus producing welds 60 designated in Figure 3. These welds cleanly and rigidly connect the ear or lug to the base metal of the body 10 along the grooved out areas 50. The dies may be designed to provide the usual weld dots which are shown at 30ª, in Figure 4 of the drawing.

It is not necessary to arcuately shape the flanges 15 and 16, but preferably they are divergently arranged with respect to the arc of the receptacle in order that as the electrodes 25 and 26 move together the flanges 15 and 16 will be shifted laterally in opposite directions for scraping of the pointed projections 30 along the receptacle for the purpose above described. While it is shown in Figure 1 that the end edges 40 closely contact the surface 11, this is not necessary, since the points 30 contact the coating 11, which is important, prior to the time that the flanges are deflected for forming the scraped areas or grooves 50.

It will be apparent from the foregoing that providing durable welds between the lug and the receptacle may be accomplished without additional operating expense and with assurance that very effective and durable welds have been provided which will not permit loosening of the lug or ear upon the receptacle nor the corrosion of the weld areas.

It is within contemplation of this invention to utilize the method herein described for welding of other members to a base metal foundation than a bail attaching ears or lugs.

Various changes in the shape, size and arrangement of parts and variations in the steps of the method herein described may be made to the form of invention shown without departing from the spirit of the invention or scope of the claims.

I claim:

1. The method of welding a metallic handle attaching lug to the base metal of a receptacle body which consists in providing a lug having a projection thereon in engagement with the receptacle, pressing the lug and receptacle between welding electrodes and laterally deflecting the lug with respect to the receptacle for causing a penetrating and scraping action of the projection upon the base metal for establishing direct welding contact therebetween, and after such penetrating and scraping action of the projection upon the base metal causing an electric current to pass through said electrodes for establishing an electric weld of the projection against said receptacle at the point of scrape contact of the projection upon said base metal.

2. The method as described in claim 1 in which the lug consists of a conventional bail attaching ear having end flanges provided with projections which will be relatively moved apart under pressing action between the electrodes to cause a penetration of the projection through coating externally on the base metal of the receptacle and a lateral scraping action therethrough upon the base metal.

3. A method of welding a lug to a receptacle as described in claim 1 in which the axis of the projection point is disposed at an acute angle with respect to the plane of that portion of the lug upon which formed.

4. The method of welding a metallic member to the base metal of another member which consists in providing upon the first member a pointed projection, placing said members between welding electrodes, initially pressing said electrodes together while out of electric circuit to cause the members to move relative to each other in a lateral direction for the scraping of the pointed projection against the base metal of the other member for cleaning an area for metallic contact of the projection and the base metal with the other member, and then causing a welding current to pass between said electrodes while continuing the pressing action of the electrodes upon said members for causing a weld of the pointed projection upon the scraped area of the base metal of the other member.

5. The steps in the method of welding a bail attaching ear to the external convex surfacing of a receptacle having a base metal body and a protecting coating externally thereon, which consists in providing a lug having laterally extending flanges provided with pointed welding projections thereon, placing said lug and receptacle between welding electrodes and pressing said electrodes together while out of electric circuit for causing a penetration of the points of the lug through said coating and a lateral scraping of the same along the coating against the base metal of the receptacle body and while the electrodes are pressing the points against the base metal of the receptacle body passing an electric welding current through them for the welding and flattening of said welding projections upon the base metal exposed by the scraping of the points through said coating.

6. The method of welding a bail or handle attaching lug formed of metal to a metal body of a receptacle which has an external protecting coating thereon which consists in providing a lug having flanged portions with relatively pointed welding projections the flanged portions being bendable with the points so spaced with respect to the contour of the receptacle body that upon conforming the contour of the flanges to that of the receptacle the points will be relatively moved farther away from each other, placing said lug and receptacle body between electrodes, then applying pressure thereto for causing bending deflecting movements of the flanged portions of the lug and movement laterally along the receptacle body and with the pointed projections in penetrating and scraped removal contact with the coating upon the body whereby to remove portions of the coating upon the receptacle for exposing and contacting the pointed projections with the base metal of the receptacle body, and during the final stages of such pressure action of the electrodes causing an electric welding current to pass therethrough for the welding and flattening of the pointed projections against said base metal at the exposed scraped areas of the coating of the receptacle body.

7. The method of welding a handle attaching lug formed of metal to the metal body of a receptacle wherein the receptacle has an external surface transverse arcuate contour struck from a predetermined radius and is provided with an external protecting coating thereon and wherein the metal attaching lug is provided with laterally extending bendable flange portions which are divergently arranged so that when the lug is placed upon the external concave surface of the metal body said metal flanges form an acute angle with respect to the said contour of the receptacle when their free ends are closest to the receptacle, and wherein said lugs are each provided with pointed projections upon their inner sides of a nature to contact the coating upon the base metal when the lug is initially placed upon the receptacle as aforesaid which consists of initially placing said lug upon the receptacle as aforesaid, in position between two welding electrodes and then applying pressure for relative proximate movement of the electrodes to cause bending deflecting movement of the flanges of the lug towards the receptacle with lateral scraping of the pointed projections along the coating of the receptacle body for removing the coating and contacting said points with the base metal of the receptacle body, and during the final stages of said pressing of the lug upon the receptacle causing an electric welding current to pass between the electrodes for the welding and flattening of the pointed projections against said base metal at the exposed scraped areas of the coating of the receptacle body.

8. The method described in claim 7 in which the lug under surfacing including the flanges are struck from a radius which is less than the radius from which the receptacle body contour is formed.

References Cited in the file of this patent

UNITED STATES PATENTS

| | | |
|---|---|---|
| 945,554 | Lachman | Jan. 4, 1910 |
| 1,670,131 | Allerton | May 15, 1928 |
| 1,872,394 | Bleicher | Aug. 16, 1932 |
| 2,450,655 | Goldsworthy | Oct. 5, 1948 |